United States Patent

[11] 3,573,372

[72] Inventors John P. Talone;
Frederick H. Dear; Hugh St. Lawrence
Dannatt, Rochester, N.Y.
[21] Appl. No. 733,531
[22] Filed May 31, 1968
[45] Patented Apr. 6, 1971
[73] Assignee The Singer Company

[54] KEYBOARD PACING MECHANISM
5 Claims, 5 Drawing Figs.

[52] U.S. Cl. .......... 178/81, 197/107, 340/365
[51] Int. Cl. .......... B41j 5/20, B41j 29/69, H041 17/8
[50] Field of Search .......... 178/79, 80, 81, 17 (A), 17 (C); 340/365; 197/107

[56] References Cited
UNITED STATES PATENTS

| | | | |
|---|---|---|---|
| 2,605,879 | 8/1952 | O'Halloran .......... | 197/107X |
| 2,869,703 | 1/1959 | Hebel .......... | 197/107X |
| 2,870,896 | 1/1959 | Riffel .......... | 197/107X |
| 3,189,153 | 6/1965 | Barnard et al. .......... | 178/79X |
| 3,327,828 | 6/1967 | Dannatt .......... | 197/107X |
| 3,457,368 | 7/1969 | Houcke .......... | 340/365X |

*Primary Examiner*—Kathleen H. Claffy
*Assistant Examiner*—William A. Helvestine
*Attorneys*—George W. Killian, Patrick J. Schlesinger, Charles R. Lepchinsky, Jay M. Cantor

ABSTRACT: A keyboard pacing mechanism for a code transmitting machine having a code selecting keyboard wherein a key lock bail locks all the keys in a rest position whenever the operation of the keys exceeds a given maximum key rate. A pacing circuit responsive to the operation of the keys controls the operation of a solenoid connected to the key lock bail so that the bail locks all the keys in the rest position when the time period between keying operations is less than a given time period.

INVENTOR.
JOHN P. TALONE
HUGH ST. LAWRENCE DANNATT
FREDERICK H. DEAR
BY Samuel R. Genca
ATTORNEY

KEYBOARD PACING MECHANISM

The present invention relates to a code producing machine having a keyboard for transmitting coded signals and, more particularly, to a keyboard pacing mechanism therefor.

Although the present invention is suited for more general applications, it is particularly adapted for a code producing machine having a keyboard such as a CONVERSATIONAL TERMINAL keyboard communication equipment manufactured by Friden, Inc. for "talking" to a computer on a time-sharing basis over a transmission line such as a telephone line. The code producing machine functions as an input-output terminal to the computer and provides a printed record of the transaction. More specifically, code producing machines connected to a telephone line are becoming a very popular way of presenting a problem to a computer and receiving the solution of the problem from the computer at a relatively high rate of speed in printed form while separated by a relatively great distance.

One of the major problems in the use of such equipment is that the data transmitted may not be acceptable to a computer if the transmission rate is greater than a given rate. In other words, the computer can only accept bits of information at a given rate and thus disregards the surplus information. This is a serious problem since this type of equipment is generally used on solutions to technical problems wherein even the loss of one bit of information may result in a false solution to the problem.

In the past, attempts have been made to provide complex electronic circuits including buffers and registers for storing the information bits when the rate of transmission exceeds a given rate. While satisfactory for the purpose intended, these circuits are relatively expensive since their cost is a function of their storage capabilities.

Accordingly, it is an object of the present invention to provide a relatively reliable, inexpensive keyboard pacing mechanism for data transmission equipment.

It is another object of the present invention to provide a new and improved keyboard pacing mechanism which paces an operator such that the operator cannot exceed a given typing rate and thus limits the rate of transmission of a code producing machine.

It is yet another object of the present invention to provide a new and improved keyboard pacing mechanism which overcomes the aforesaid prior art problems.

It is still another object of the present invention to provide a means for transmitting information bits or coded signals to a computer by way of a transmission line at a rate not exceeding a given rate inexpensively and a means which is simple to use and is reliable.

Briefly described, the present invention accomplishes the above and other objects in one embodiment of the invention in a keyboard pacing mechanism for a code producing machine having code selecting keys. The machine includes a keyboard interlock means for limiting the operation to only one of the keys at a time in the keyboard. A code selector means is also included for deriving coded signals or information bits corresponding to the code selecting keys. Further included is a pivotally mounted bail transverse to all the keys and a solenoid normally energized for locking all the keys in a rest position when deenergized. A pacing circuit is connected between the solenoid and the code selector means for deenergizing the solenoid for a given time period after the operation of each of the keys so that all the keys are locked in the rest position for at least a given time period between keying operations. Thus, information bits or coded signals cannot be transmitted at a rate exceeding a given rate, since the keys are locked in the rest position for the given time period after each operation.

Other objects of the invention will be pointed out in the following description and claims, and illustrated in the accompanying drawing which discloses by way of example the principle of the invention and the best mode which has been contemplated of applying that principle.

Figures 1, 2, 3, 4, 5:
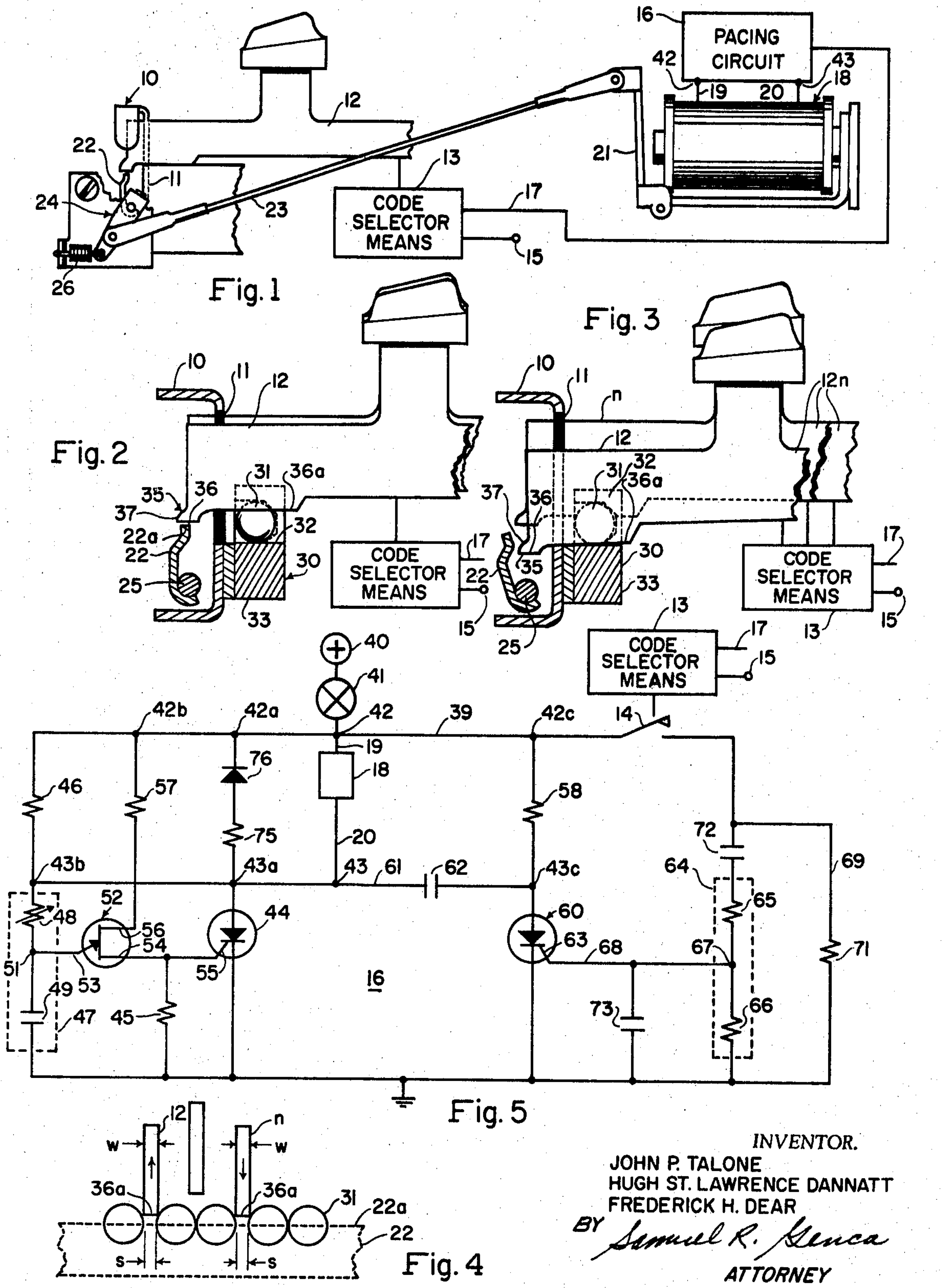
FIG. 1 is a side view partly broken away to illustrate a keyboard pacing mechanism in accordance with the invention.
FIGS. 2 and 3 are fragmentary views showing two modes of operation of the keyboard pacing mechanism of FIG. 1.
FIG. 4 shows cooperation between a ball interlock means and a bail in the keyboard pacing mechanism of FIG. 1.
FIG. 5 is a schematic view of a pacing circuit utilized in the keyboard pacing mechanism of FIG. 1.

The present invention may be embodied in different keyboard code producing machines and is shown by way of example in FIGS. 1—3 in one embodiment of the structure shown in U.S. Pat. No. 2,700,446 entitled "Tape Controlled Typewriter" issued Jan. 25, 1955, to E. O. Blodgett and assigned to the assignee as the present application. Only the structure necessary to show the invention is illustrated in FIGS. 1—3. For a more complete description of the structure, reference may be made to the above-mentioned patent.

Referring more particularly to FIGS. 1—3 of the drawing, a keyboard pacing mechanism embodying the present invention includes a keyboard frame structure 10 having a plurality of comb slots 11 for guiding a corresponding plurality of pivotally mounted keys **12–*n*. The keys 12–*n* are connected to a code selector means 13 for generating codes or information bits corresponding to the different keys 12–*n* when the keys 12–*n* are moved from a rest position (FIG. 1) to a key operated position (FIG. 3). The codes selected may be in binary form in a manner well-known to those skilled in the art. The code selector means 13 may, for example, include a translator (not shown) having a common selector switch 14** as more fully described in the aforesaid patent.

The code selector means 13 includes an output terminal 15 which may be connected to a transmission line such as a telephone line for transmitting the code signals or information bits to a utilization device such as a computer (not shown). The code selector means 13 in accordance with the invention is connected to a pacing circuit 16 by way of a lead 17. The pacing circuit 16 will be described hereinafter in more detail in conjunction with FIG. 5.

The pacing circuit 16 is connected across a solenoid 18 by leads 19 and 20. The solenoid 18 includes an armature 21 connected to a pivotally mounted bail 22 by a link 23 and a rocker arm 24. The bail 22 is fixed to a shaft 25 which is pivotally mounted on the structure 10. The rocker arm 24 is fixed to the shaft 25 as by a set screw (not shown). The bail 22 is positioned transverse to the keys **12–*n* and is movable in pivotal manner between key locking and nonlocking positions as shown in FIGS. 2 and 3, respectively. The rocker arm 24 and bail 22 are yieldingly urged towards the locked or locking position by a spring 26. The solenoid 18 when energized rotates the shaft 25 into a counterclockwise direction and urges the bail 22 into the unlocked or the nonlocking position as shown in FIG. 3. When the solenoid 18 is deenergized, the shaft 25 is rotated into a clockwise direction by the spring 26 so that the bail 22** is moved into the locked or the locking position as shown in FIG. 2.

The keyboard pacing mechanism further includes a key interlock means 30 comprising a row of spaced balls 31 disposed in a channel 32 of a frame 33 so that only one key **12–*n* can be depressed between the balls at one time. In other words, there is only sufficient space for the insertion of one and only one of the keys 12–*n* between the balls at one time. Although the key interlock means 30 is shown as a mechanical device having a plurality of balls 31, it should be understood that other key interlock means may be utilized without departing from the invention. For example, the interlock means 30 may include cylinders slideably disposed in the channel 32** or may be of the type which includes a flexible ribbon disposed over a plurality of slots such that a selected key urges a portion of the tape within the corresponding slot and prevents the insertion of other keys in other corresponding slots.

Each of the keys **12–*n* includes a heel portion 35 which coacts with the bail 22 for locking the keys 12–*n* in the rest position as shown in FIG. 2. The heel portion 35 includes a flat base portion 36 and a rounded cam portion 37. The rounded cam portion 37 cams the bail 22 in an outward or counterclockwise direction when any one of the keys 12–n is returning to the rest position. Normally the interlock means 30 prevents the simultaneous depression of two or more keys while the bail 22 prevents the operation of all the keys 12–n when the solenoid 18 is energized. The rounded cam portion 37 compensates for an overlapping sequence between the bail 22 and the interlock means 30** as will be explained hereinafter in more detail.

In FIG. 4, the cooperative relationship of the keys 12–n, bail 22, and the interlock means 30, including the balls 31, is shown. In the cooperation of the above members it is desirable from an operator's point of view not to feel the bail 22 when it is in the locking position (FIG. 2) during typing. It would appear that it may be more desirable to have the operator feel the operation of the interlock means 30 even though the bail 22 is continuously moving from a nonlocking position when the solenoid 18 is energized to a locking position when the solenoid is deenergized. This is accomplished by providing a space between the flat portion 36 of the heel portion 35 and a top portion 22a of the bail 22 at a time when the bail 22 is moving into the locking position or is already in the locking position. The spacing is derived from an aggregate spacing *s* between the balls 31, the sum of which spacing *s* is slightly greater than the width *w* of any one of the keys 12–n. Further, the spacing between the flat portion 36 and the top portion 22a is derived at a point in time when one of the keys 12 is returning to a rest position and another one of the keys *n* is just starting to enter the space between two of the balls 31 so that the spacing *s* between the balls at each of the key 12 and key *n* are equal. At that point in time, the space between the flat portion 36 and the top portion 22a exist. Furthermore, this arrangement insures that the keys 12–n do not interfere with the function of the bail 22, namely, as it cycles through the nonlocking and locking positions.

Referring to FIG. 5, the pacing circuit 16 under the control of the code selector means 13 normally energizes the solenoid 18 so that the bail 22 is normally disposed in the nonlocking position rendering all the keys 12–n operative. The bail 22 is moved into the locking position each time the solenoid 18 is deenergized. The deenergization occurs each time one of the keys 12–n is operated, but is followed by a reenergization of the solenoid after a given time period by the pacing circuit 16 in a manner to be now described.

The pacing circuit 16 is shown connected to a source of direct current voltage at 40 which source 40 may be switched to the pacing circuit 16 by a main switch 41 at junctions 42, 42a, 42b, and 42c which are all connected in common by a line 39 to provide alternate current paths to ground. The silicon controlled rectifier 44 is connected back to junction 42a through a resistor 75 and a back-biased rectifier 76 and junction 43a to avoid damage to the silicon controlled rectifier 44 by back-E.M.F. (voltage) effected coincident with the deenergization of the solenoid 18. One current path to ground is by way of the solenoid 18 through leads 19 and 20 connected to junctions 43, 43a, in series with a silicon controlled rectifier 44. Another current path to ground is through a resistor 46 connected in series with an RC network 47 including an adjustable resistor 48 and a DC blocking capacitor 49. A junction 43b is disposed between resistors 46 and 48. Another junction 51 is disposed between resistor 48 and capacitor 49. The controlled rectifier 44 is normally biased in a forward direction by a unijunction transistor 52 having an emitter electrode 53 connected to junction 51 and a base electrode 54 connected to a gating terminal 55 of the controlled rectifier 44. A base resistor 45 is connected from the base electrode 54 to ground to provide a load resistance. The other base electrode 56 of the transistor 52 is connected to junction 42b through a resistor 57 so that when the switch 14 is open the voltage on junction 42b and 51 forward bias the transistor 52 and the silicon controlled rectifier 44 into conduction. Thus, a circuit is completed between the source 40 and the solenoid 18 and the controlled rectifier 44 to ground. When the silicon controlled rectifier 44 is conducting the solenoid 18 is normally energized.

The pacing circuit 16 includes another circuit path from junction 42 and 42c to ground through a resistor 58, a junction 43c, and a silicon controlled rectifier 60. The three circuit paths just described are connected in common at junctions 43, 43a, 43b, and 43c by a common line 61, except that a DC blocking capacitor 62 is disposed between junction 43 and 43c to provide a DC isolation therebetween. The circuit path containing the resistor 58 and control rectifier 60 is isolated in a DC manner from the circuit path containing the solenoid 18 and a silicon controlled rectifier 44 and is also isolated in a like manner from the other circuit path containing the RC network 47 and resistor 46. The silicon controlled rectifier 60 is normally back-biased in the absence of a biasing voltage at its gating terminal 63. This occurs when the switch 14 is in an open condition as shown in FIG. 5. The switch 14 is connected in another circuit path of the pacing circuit 16 which includes a voltage divider network 64 including resistors 65 and 66 having a junction 67 disposed therebetween. The junction 67 is connected to the gating terminal 63 of rectifier 60 by a lead 68. Bypassing the voltage divider network 64 is a resistor 71 connected in parallel to the voltage divider network 64 to ground. DC blocking capacitors are disposed at 72 and 73.

In the operation of the keyboard pacing mechanism, the switch 41 is normally turned on simultaneously with the power switch (not shown) of the code producing machine. Upon the turning on of the switch 41, the voltage source 40 supplies a DC potential at junctions 42, 42a, 42b, and 42c. The switch 14 as was previously mentioned is normally held in an open position until the actuation of one of the keys 12–n. When the positive DC potential is applied on junctions 42, 42a, and 42b, the capacitor 49 charges to a given voltage at junction 51, while the potentials on junctions 42b and 43a are such that the unijunction transistor 52 is rendered conducting and the silicon controlled rectifier 44 is in a forward biased or conducting state, thus providing a conducting circuit path from the source 40 through the now energized solenoid 18 and through the forward biased rectifier 44 to ground. With the energization of the solenoid 18, the armature 21 is "pulled in" causing the linkage 23 to move to the right rotating the rocker arm 24 in a counterclockwise direction to rotate the shaft 25 and the bail 22 into the nonlocking position, thus rendering all the keys 12–n operative. In the normal state, the solenoid 18 is energized since the silicon controlled rectifier is forward biased as just described.

When one of the keys 12–n is depressed within its corresponding comb slot 11 the adjacent balls 31 are moved outwardly therefrom permitting the selected key 12–n to actuate the code selector means 13 to generate a code therefrom corresponding to the key selected and at the same time close the switch 14. Upon closure of the switch 14, the DC voltage from source 40 is applied across the resistor 71 to ground by way of thelead 69 and at the same time a biasing potential is derived at junction 67 of the voltage divider network 64. The voltage divider biasing potential at junction 67 turns on the rectifier 60 thereby providing a low impedance path for the potential on junctions 43, 43a, 43b, and 43c to ground. The change in potential on lead 61 is sufficient toback bias the silicon controlled rectifier 44 so that the silicon controlled rectifier 44 now provides a high impedance and effects the deenergization of the solenoid 18. Upon deenergization of the solenoid 18, the spring 26 urges the rocker arm 24 and the bail 22 in a clockwise direction locking all the keys 12–n in the rest position as shown in FIG. 2. Upon the return of the operated key 12–n, the switch 14 is returned to an open position as shown in FIG. 5. It should be understood, however, that upon the operation of any one of the keys 12–n, the code selector means switch 14 will automatically return to the open position independently of the selected keys 12–n. In the event the selected one of the keys 12–n is not returned to the rest position before the bail 22 pivots to the locking position, the spring 26 and bail 22 yield so that the cam portion 37 of the heel portion 35 may bypass the bail 22 and the selected one of the keys 12–*n* returns to its rest position. When the switch 14 is reopened, the potential or voltage on junction 67 is removed. During the time the controlled rectifier 44 is back biased, the DC potential at junctions 43, 43*a*, and 43*b* is reapplied to the capacitor 49 of the RC timing circuit 47 and the capacitor 62. The capacitor 49 charges at a given time rate for a given time period (*t*) to a voltage level which is sufficient to trigger the unijunction transistor 52 into conduction. When the unijunction transistor 52 is conducting, the controlled rectifier 44 is also forward biased and conducting. The time rate of charging the capacitor is a function of the RC network 47 and can be adjusted by the adjustable resistor 48. The time period (*t*) for charging the capacitor may be in the order of ninety (90) milliseconds so that only a maximum of ten (10) characters per second may be transmitted by a keyboard operator. When the controlled rectifier 44 is conducting, current flows through the solenoid 18 and through the controlled rectifier 44 to ground. Upon the energization of the solenoid 18, the armature 21 is pulled into the solenoid 18 and effects a rotation of the rocker arm 24 and the bail 22 in a counterclockwise direction to unlock all the keys 12–*n* for the start of a new key selection sequence as heretofore described. It may now be seen that the keys 12–*n* cannot be operated during the time period (*t*) since the solenoid is deenergized, but can be operated after the time period (*t*) so that a maximum typing rate is a function of the time period (*t*). The time period may be varied by adjusting the resistor 48.

It will be evident from the foregoing description of the invention that a keyboard pacing mechanism embodying the invention is a compact, relatively simple construction for pacing an operator so that only a given rate of typing speed may be effected since the keyboard is locked by the bail 22 for the given time period after the operation of each key 12–*n*.

While there have been described specific forms of the invention for purposes of illustration, it is contemplated that numerous changes may be made without departing from the spirit of the invention.

We claim:

1. In a code producing machine having a keyboard for transmitting coded signals in response to the operation of any selected key of a plurality of keys of said keyboard, a keyboard pacing mechanism comprising:

a, keyboard interlock means for limiting the operation to only one of said keys of said keyboard, at any one time;

b. code selector means for providing coded output signals indicative of the operated one of said keys;

c. solenoid actuated bail means for unlocking and locking all said keys when said solenoid is operated to a first and an opposite state, respectively;

d. pacing circuit means connection between said solenoid and said code selector means for operating said solenoid to said opposite state for a predetermined time period after the operation of any one of said keys so that all of said keys are locked in said reset position for at least said predetermined time period between successive keying operations and wherein said pacing circuit includes; 1. A silicon controlled rectifier having a gate lead; and ii. control means for applying an electrical pulse to said gate of said rectifier after said predetermined time period.

2. The invention defined in claim 1 wherein said first state of said solenoid is the energized state and said opposite state of said solenoid is the deenergized state.

3. The invention defined in claim 1 wherein:

a. said silicon controlled rectifier is connected in series with said solenoid; and b. said control means includes a unijunction transistor.

4. The invention defined in claim 1 wherein: a. said silicon controlled rectifier is connected in series with said solenoid; and b. said control means includes a circuit network having a time constant equal to said predetermined time period.

5. The invention defined in claim 1 wherein the operated one of said keys includes means for interacting with said bail and said interlock to pivot said bail towards said unlocked position while the operated one of said keys returns to said reset position and without permitting the operation of any of the other of said keys during said predetermined time period.